(12) United States Patent
Zaviska

(10) Patent No.: US 6,309,033 B1
(45) Date of Patent: Oct. 30, 2001

(54) SWITCHABLE ORIFICE SOLENOID WITH PLATE VALVE FOR AN ANTI-LOCK BRAKE SYSTEM

(75) Inventor: Dalibor Zaviska, Rochester, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 0 days.

(21) Appl. No.: 09/345,025

(22) Filed: Jul. 2, 1999

(51) Int. Cl.[7] .............................. B60T 8/36; F16K 31/02
(52) U.S. Cl. ........................ 303/119.2; 303/119.1; 137/630.14; 137/630.15; 137/630.17; 137/630.22; 251/129.19; 251/83
(58) Field of Search .................. 303/119.1, 119.2; 137/629, 630, 630.15, 630.14, 630.17, 630.19, 630.22; 251/83, 82, 129.19, 129.01, 129.02

(56) References Cited

U.S. PATENT DOCUMENTS

| | | | |
|---|---|---|---|
| 1,419,254 | * | 6/1922 | Grebe . |
| 2,073,168 | * | 3/1937 | Newell .......................... 137/630.15 |
| 2,502,256 | * | 3/1950 | Harding, Jr. ........................ 277/36 |
| 2,568,982 | * | 9/1951 | Bertea .......................... 137/630.15 |
| 2,647,537 | * | 8/1953 | Klingler ........................ 137/630.19 |
| 3,961,645 | * | 6/1976 | Kagan .......................... 137/630.15 |
| 4,287,864 | * | 9/1981 | Takada et al. ..................... 123/440 |
| 4,619,438 | * | 10/1986 | Coffee .......................... 251/129.01 |
| 4,638,974 | * | 1/1987 | Zeuner et al. ................... 251/129.15 |
| 4,756,331 | * | 7/1988 | Stegmaier .......................... 137/271 |
| 4,782,862 | * | 11/1988 | Nguyen .......................... 137/630.14 |
| 4,882,558 | * | 11/1989 | Takayanagi ........................ 335/260 |
| 4,932,632 | * | 6/1990 | Nicol .......................... 251/129.02 |
| 4,987,923 | * | 1/1991 | Tackett .......................... 137/596.17 |
| 5,209,455 | * | 5/1993 | Uetsuhara et al. ............... 251/129.19 |
| 5,228,597 | * | 7/1993 | Low .................................. 222/129.1 |
| 5,393,132 | * | 2/1995 | Yogo et al. ........................ 303/116.1 |
| 5,522,426 | * | 6/1996 | Zutt et al. ............................ 137/599 |
| 5,535,725 | * | 7/1996 | Baker et al. ........................ 123/520 |
| 5,681,098 | * | 10/1997 | Ganzel et al. ..................... 303/119.2 |
| 5,905,423 | * | 5/1999 | Hoppe .................................. 335/230 |
| 6,084,493 | * | 7/2000 | Siegel .................................. 335/278 |

* cited by examiner

Primary Examiner—Christopher P. Schwartz
Assistant Examiner—Melody M. Burch
(74) Attorney, Agent, or Firm—Rader, Fishman & Grauer PLLC

(57) ABSTRACT

A switchable solenoid valve is disposed between the master cylinder port and the wheel caliper port for an anti-lock brake system. The switchable solenoid valve includes a valve housing, a valve seat that includes a center orifice and a plurality of perimeter bores, and an axially moveable valve plate and tappet for sealing against the valve seat. The switchable solenoid valve is movable between a normally open position, a closed position and an intermediate position that occurs when the brake system is in anti-lock mode. In the open position, both the valve plate and tappet are spaced away from the valve seat to allow unrestricted pressure fluid flow between the master cylinder and the wheel caliper. When the solenoid valve is moved in to the closed position, the valve plate is in face-to-face engagement with the valve seat to seal the perimeter bores while the tappet is simultaneously sealingly engaged with the center orifice. When the brake system is in anti-lock mode, the valve is switched into the intermediate position and the valve plate remains sealed against the valve seat due to a pressure difference between the master cylinder port and the wheel caliper port, while the tappet moves partially away the center orifice to permit restricted fluid flow to flow between the master cylinder port and the wheel caliper port.

18 Claims, 7 Drawing Sheets

SWITCHABLE ORIFICE SOLENOID WITH PLATE VALVE FOR AN ANTI-LOCK BRAKE SYSTEM

FIELD OF THE INVENTION

The invention relates to anti-lock brake systems for automotive vehicles and more particularly, to an anti-lock brake system having a switchable orifice solenoid.

BACKGROUND OF THE INVENTION

Referring to FIG. 1, anti-lock brake systems typically include a normally open solenoid valve 10 that is positioned between a master cylinder brake circuit 12 and a wheel caliper circuit 14 to interrupt build-up of brake fluid pressure and restrict brake fluid flow when the brakes are actuated into an anti-lock mode. When the solenoid valve 10 is in the open position, the restriction in brake fluid flow is preferably as low as possible to prevent degradation in the braking performance during normal apply and release of the brakes. However, during the anti-lock mode, it is preferred that the flow restriction in the valve 10 be high enough such that an in-rush of brake fluid, when the valve 10 switches from closed to open, is limited. The in-rush of fluid may be quantified as the pressure gain in the wheel caliper circuit. Limiting the pressure gain when the brakes are switched to the anti-lock mode is desirable to prevent excessive overshooting of the target pressure level in the wheel caliper circuit being controlled during anti-lock mode. To accomplish high flow restriction and limit pressure gain with a one size solenoid valve, either flow restriction or a reduced pressure gain must be compromised.

To reduce the problems associated with typical anti-lock braking systems, one known brake system, as depicted in FIG. 2, employs a switchable orifice 100 that cooperates with a solenoid tappet 110. The switchable orifice permits free flow of brake fluid between the master cylinder circuit 115 and the wheel caliper circuit 120 during normal braking. When the solenoid tappet 110 is energized, it closes against a valve seat 125 during the anti-lock mode. A pressure difference across a switching valve 130 overcomes a switching valve spring 135, causing the switching valve to close and restrict the flow to the switched orifice 100 which is impressed into the switching valve. The flow path between the master cylinder circuit and the wheel caliper circuit is then restricted during anti-lock mode build cycles. The flow path remains restricted until pressure is released from the master cylinder circuit, i.e., the driver releases the brake. While systems of this type allow for high flow restriction and serve to limit pressure gain, they are undesirable due to higher part complexity, increased manufacturing costs and hysteresis of the moving portion of the valve.

This system is also undesirable as the it requires the use of a Bernoulli effect force on the back side of the switching valve to prevent unwanted switching of the valve during a fast brake apply. The Bernoulli effect is generated by use of the bernoulli orifice 140. With this arrangement, the secondary orifice of the switching valve is limited in size such that this type of arrangement may only be useful in smaller vehicles. Further, systems of this type also require an additional elastomer seal 145 to prevent leakage of brake fluid while in the switched position.

Therefore, there exists a need for a switchable orifice solenoid valve for an anti-lock brake system that limits pressure gain during the anti-lock braking mode while simultaneously restricting in-rush of brake fluid during valve switching, where the system is cost effective to manufacture and eliminates hysteresis and the use of a Bernoulli effect force on the back side of the switching valve.

SUMMARY OF THE INVENTION

The present invention is directed to a switchable solenoid valve for an anti-lock brake system. The solenoid valve includes a valve housing having a master cylinder port and a wheel caliper port, a valve seat positioned within the valve housing between the master cylinder port and wheel caliper port, and axially movable tappet and valve plate for sealing against the valve seat. The valve seat includes a center orifice and perimeter bores formed therethrough through which pressurized fluid may flow from the master cylinder port to the wheel caliper port when the tappet and valve plate are in open positions. Fluid flow is fully interrupted when the tappet and valve plate are in closed positions. In the closed position, the tappet is sealed against the center orifice while the valve plate simultaneously seals the perimeter bores. During an anti-lock mode, a pressure difference between the master cylinder and the wheel caliper ports causes the valve plate to remained sealed against the perimeter bores, while the tappet is moved into an intermediate position. In the intermediate position, the tappet partially unseals the center orifice to permit fluid to flow restricted though the center orifice only.

In accordance with one aspect of the invention, the tappet has a shaft, a reduced diameter portion, an annular rim and a sealing portion. The valve plate is mounted on the reduced diameter portion of the tappet such that the tappet and valve plate may move axially with respect to one another. During the anti-lock mode, as the tappet is moving away from the center orifice, the valve plate serves to restrict the tappet from fully unsealing the center orifice, thereby producing restricted flow between the master cylinder and wheel caliper ports, easily and with a minimum of parts.

In accordance with another aspect of the invention, the valve plate is further provided with a plurality of radially inwardly extending notches formed on a peripheral edge. The notches allow for increased fluid flow around the valve plate when the solenoid valve is in a normally open position. The valve plate is further provided with a center bore through which the reduced diameter portion of the tappet is received. Radially outwardly extending channels may also be provided around the periphery of the center bore to further increase fluid flow and to insure that the tappet and valve plate are axially movable with respect to one another.

The present invention provides for a more simplified design than the prior art, thereby reducing manufacturing costs. Further, the present invention also eliminates the need for a second Bernoulli orifice to prevent unwanted switching operations, such that the size restrictions associated with the use of Bernoulli orifices are eliminated.

DETAILED DESCRIPTION OF THE PREFERRED EMBODIMENT

Overview of Solenoid Valve with Switchable Orifice

Figure 1:
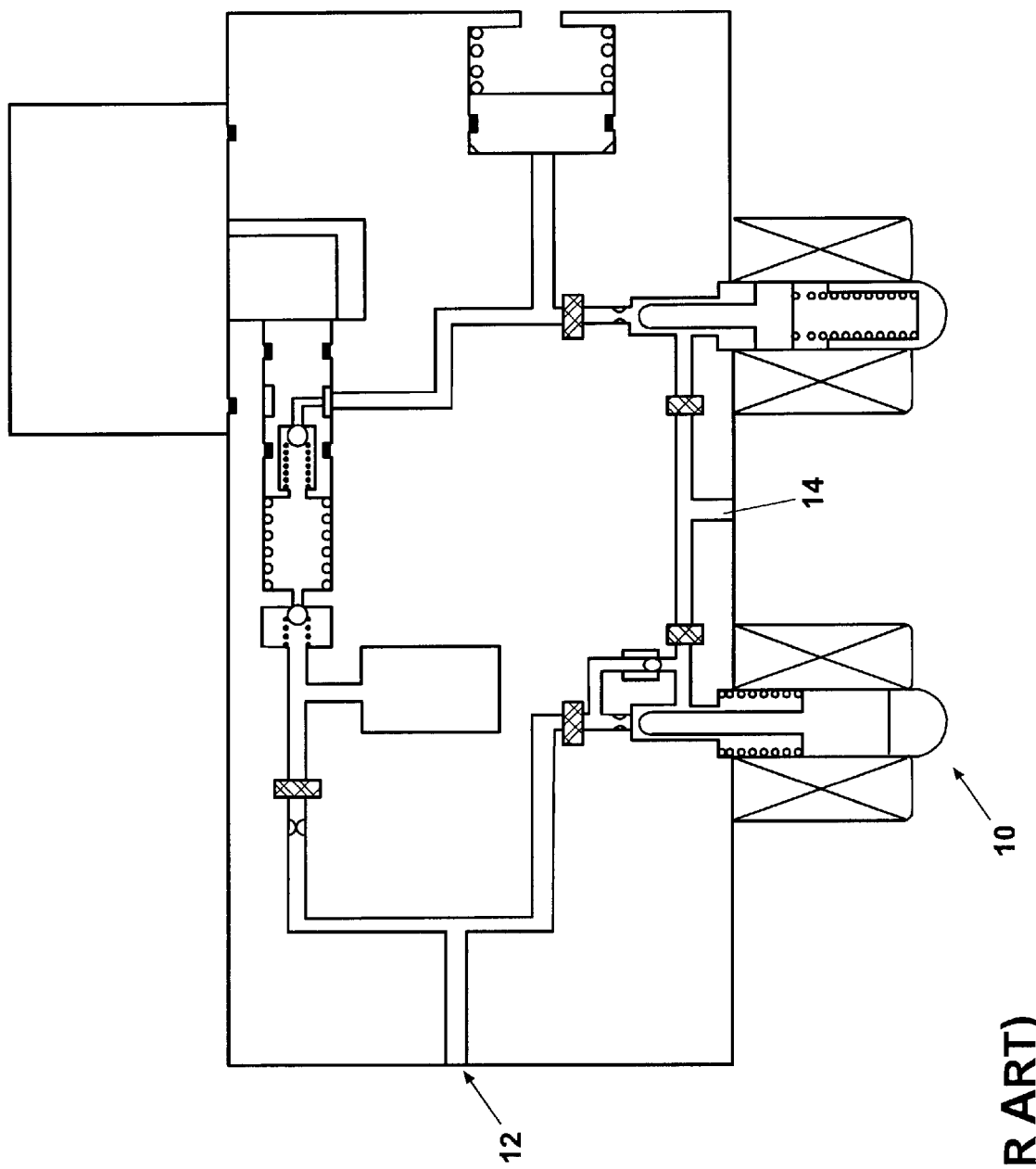
FIG. 1 is a schematic of a prior art braking system embodying an anti-lock system.
Figure 2:
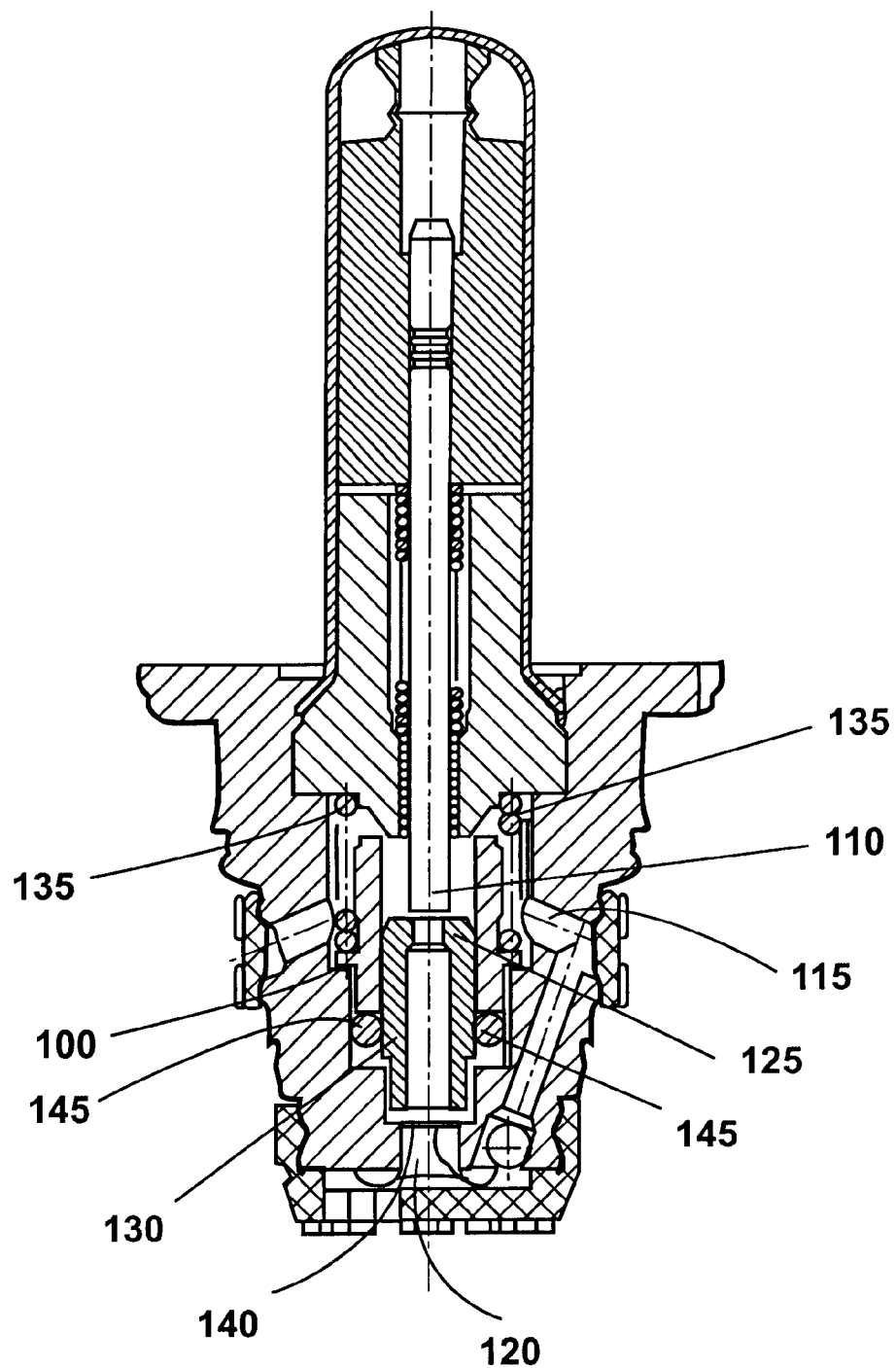
FIG. 2 is a cross-sectional view of a prior art switchable orifice control valve.
Figure 3:
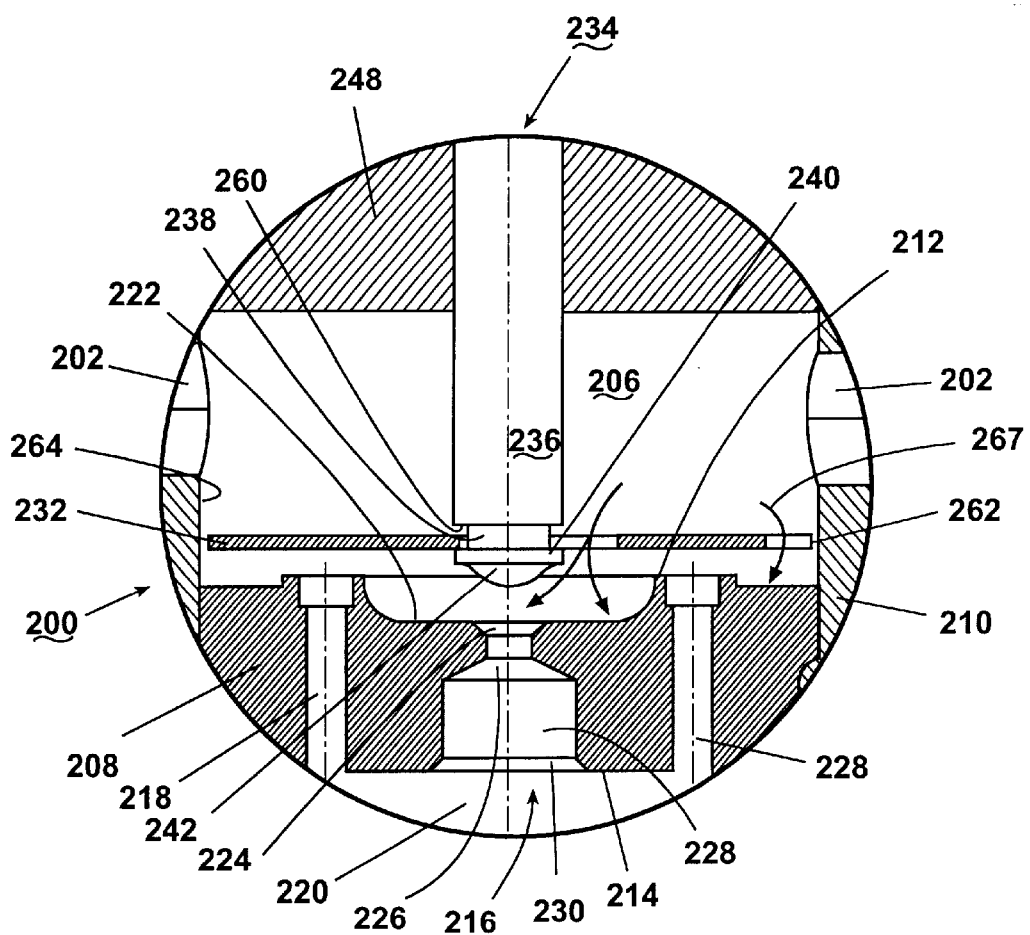
FIG. 3 is a blown up cross-sectional view of a switchable orifice control valve including a valve plate in a normally open position in accordance with the present invention.

Referring to FIGS. 3–9, in a braking circuit having an anti-lock mode, a master cylinder port 202 is fluidly connected to a wheel caliper port 204 of the circuit via a normally open switchable solenoid valve 200. Solenoid valve 200 includes a first pressure chamber 206 disposed above a stationary valve seat 208, as best seen in FIG. 3, to which master cylinder port 202 is fluidly connected. Valve seat 208 is fixedly connected to a valve housing 210. Valve seat 208 has an input end 212 and an output end 214. A center orifice 216 and parallel perimeter bores 218 extend through valve seat 208 from input end 212 to output end 214, and open into a second pressure chamber 220 disposed below valve seat 208. Second pressure chamber 220 is in fluid connection with wheel caliper port 204.

Referring to FIG. 3, in one embodiment input end 212 of center orifice 216 includes a relatively wide shoulder 222, a first funnel section, 224, a reverse funnel section 226, a straight section 228; and a second reverse funnel section 230. Shoulder 222 is spaced from input end 212 a predetermined distance, to be explained in greater detail below. Funnel section 224 is positioned directly adjacent shoulder 222 to direct fluid through valve seat 208 to a first reverse funnel section 226 which opens up to straight section 228. Second reverse funnel section 230 directs fluid to second pressure chamber 220 at output end 214 of valve seat 208. Other suitable configurations of center orifice 216 that permit appropriate fluid flow are also contemplated.

Figure 5:
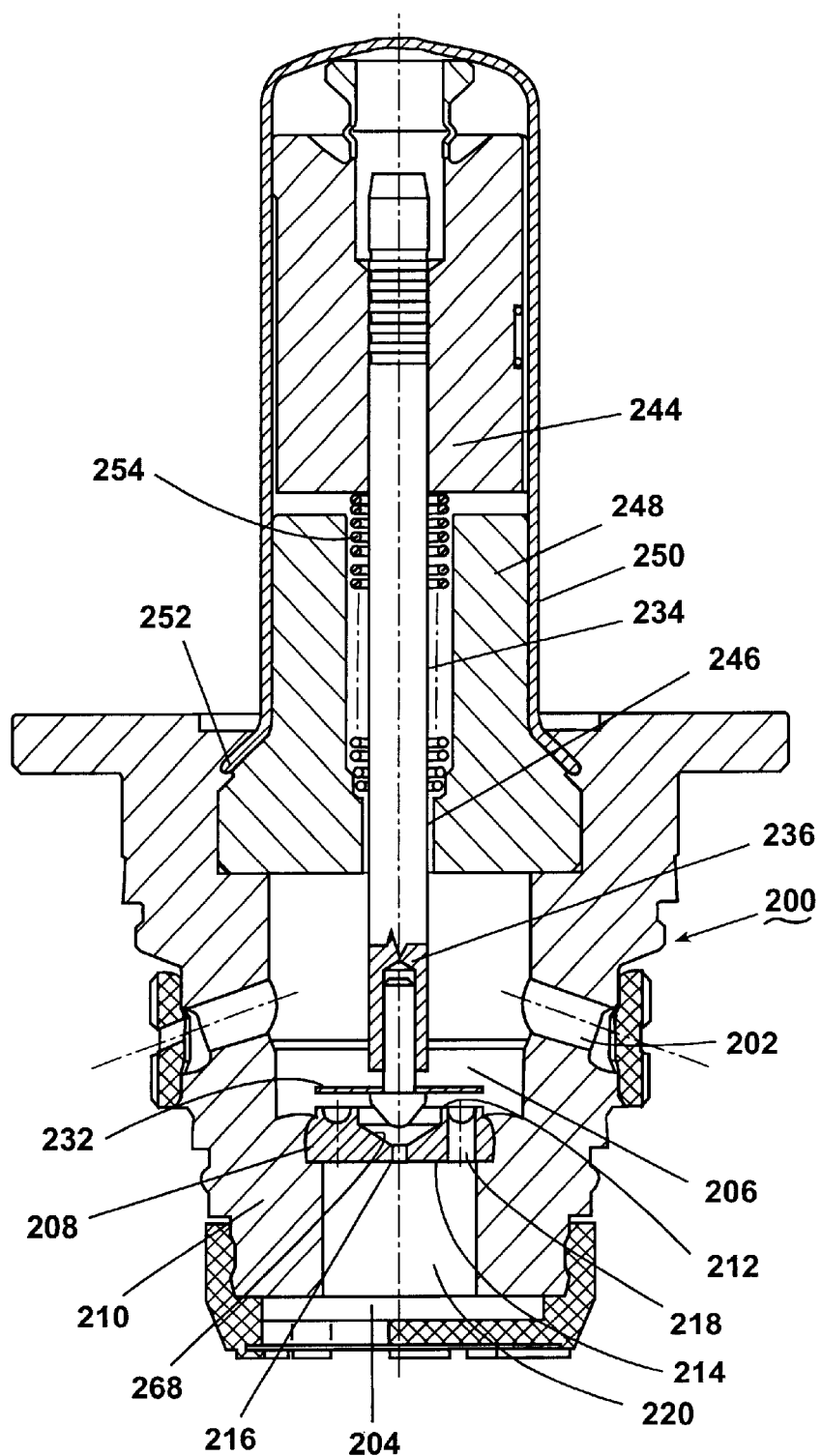
FIG. 5 is a cross-sectional view of the switchable orifice control valve in the normally open position.
Figure 6:
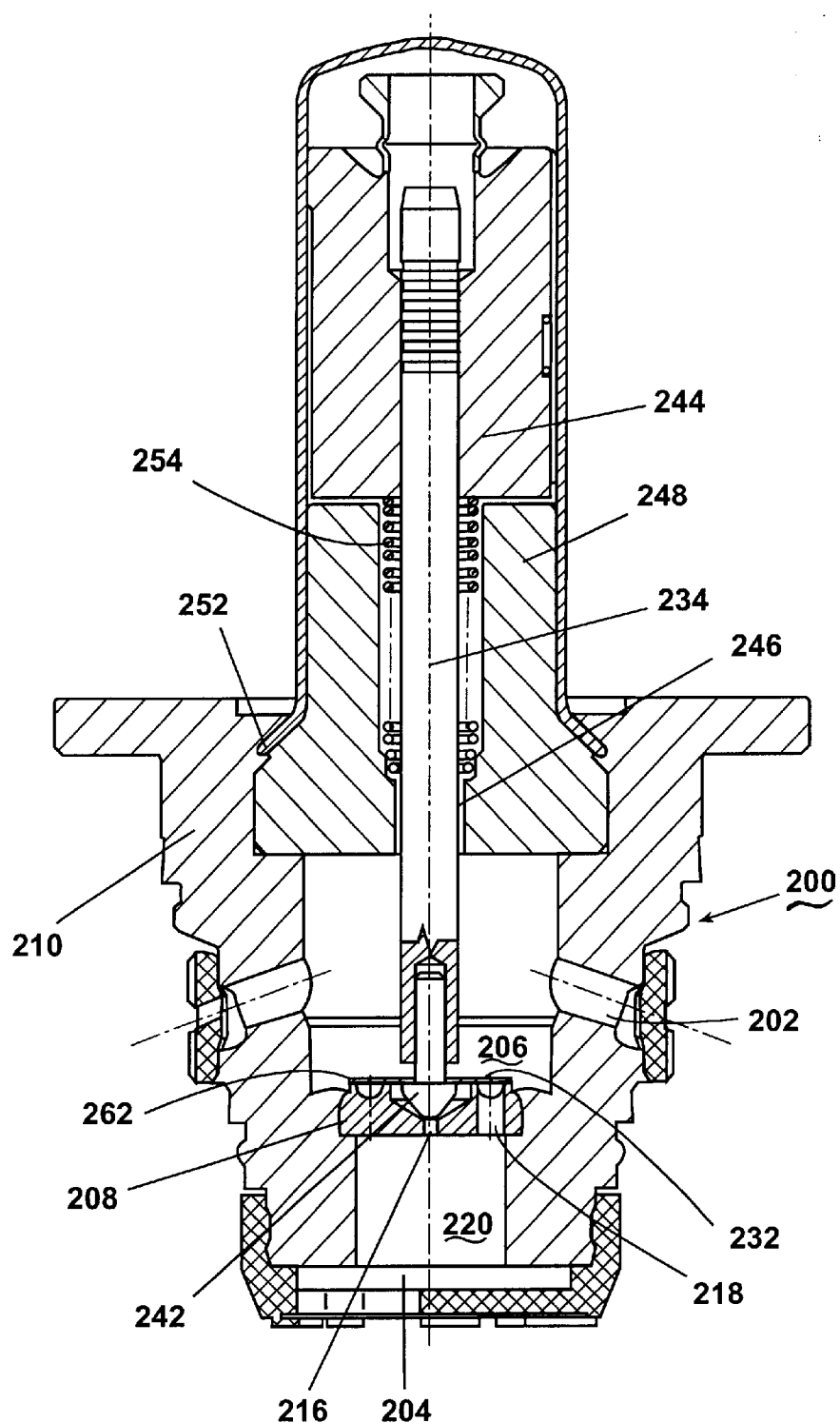
FIG. 6 is a cross-sectional view of the switchable orifice control valve in a closed position.
Figure 7:
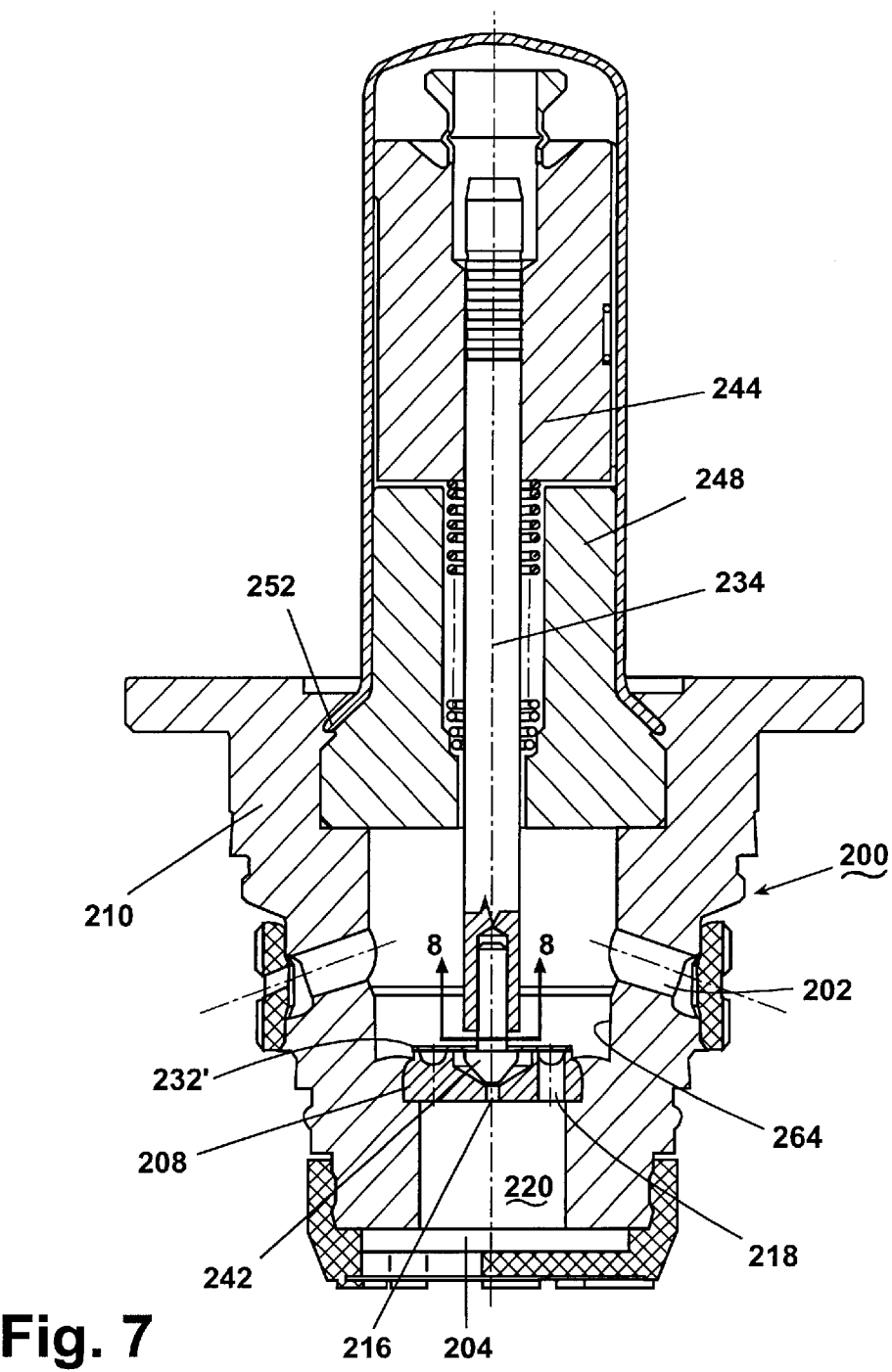
FIG. 7 is a cross-sectional view of the switchable orifice control valve during anti-lock mode.

Solenoid valve 200 further includes a slotted valve plate 232 disposed in first pressure chamber 206. Valve plate 232 is mounted on a tappet 234, where tappet 234 is positioned so as to be generally aligned with center orifice 216 in valve seat 208. Tappet 234 includes a shaft 236, a reduced diameter portion 238, an annular rim 240 and a sealing portion 242. Shaft 236 is secured to a magnetic armature 244 and extends through a bore 246 of a magnetic core 248 to first pressure chamber 206. Magnetic core 248 is fixedly secured to a sleeve 250 and magnetic armature 244 is slidably mounted within sleeve 250, as best seen in FIGS. 5–7. A base 252 of sleeve 250 is staked with valve housing 210. A spring 254 serves to bias magnetic armature 244 away from magnetic core 248 to keep solenoid valve 200 in the normally open position, as shown in FIG. 5. A solenoid coil assembly (not shown) circumscribing sleeve 250 generates, when energized, a magnetic field sufficient to overcome spring 254 and bias magnetic armature 244 toward magnetic core 248, thereby moving tappet 234 and valve plate 232 toward valve seat 208 to close solenoid valve 200. The switching operation from the open to closed position will be explained below in greater detail.

Figure 4:
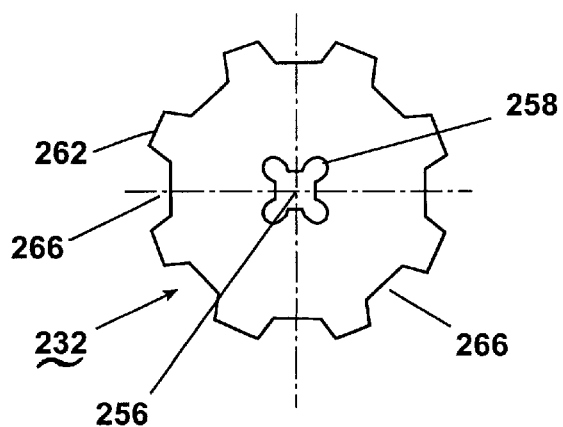
FIG. 4 is a plan view of the valve plate according to the present invention.

Reduced diameter portion 238 of tappet 234 is positioned in a center bore 256 of valve plate 232 to secure valve plate 232 to tappet 234. Center bore 256 allows quick and easy assembly onto tappet 234 prior to tappet 234 being positioned in valve housing 210. Center bore 256, as best seen in FIG. 4, further includes radially extending channels 258 to insure that valve plate 232 is loosely fitted radially on reduced diameter portion tappet 234 such that tappet 234 and valve plate 232 are axially movable with respect to one another. Annular rim 240, which has a diameter slightly larger than the diameter of channels 258, serves to prevent valve plate 232 from disengaging from tappet 234. An annular shoulder 260 of shaft 236 and annular rim 240 cooperate with valve plate 232 to limit the axially movement of tappet 234, to be explained below in greater detail.

Sealing portion 242 of tappet 234 serves to seal off center orifice 216 when solenoid valve 200 is switched into the closed position. Sealing portion 242 is preferably contoured to sealingly engage with funnel shaped section 224. Reduced diameter portion 238, annular rim 240 and sealing portion 242 collectively have a length that is slightly less than or substantially equal to the collective depth of funnel shaped section 224 and shoulder 222, to be explained in greater detail below.

In one embodiment, valve plate 232 is sized such that a peripheral edge 262 extends radially to an interior wall 264 of first pressure chamber 206. To facilitate fluid flow from master cylinder port 202 to wheel caliper port 206 when solenoid valve 200 is in the open position, peripheral edge 262 is provided with radially inwardly extending notches 264 such that fluid may flow through notches 266 in addition to channels 258 and center bore 256, as shown by directional arrows 268, when solenoid valve 200 is in the open position. Channels 258 are shown radiused such that center bore 256 and channels 258 together form a clover shape. However, other suitable shapes may also be employed. Notches 266 are shown as having a generally rectangular shape, although other suitable shapes may be employed.

Figure 8:
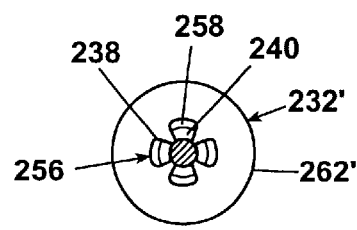
FIG. 8 is a partial cross-sectional view of the valve plate and a sealing tappet along lines 8—8 in FIG. 7.
Figure 9:
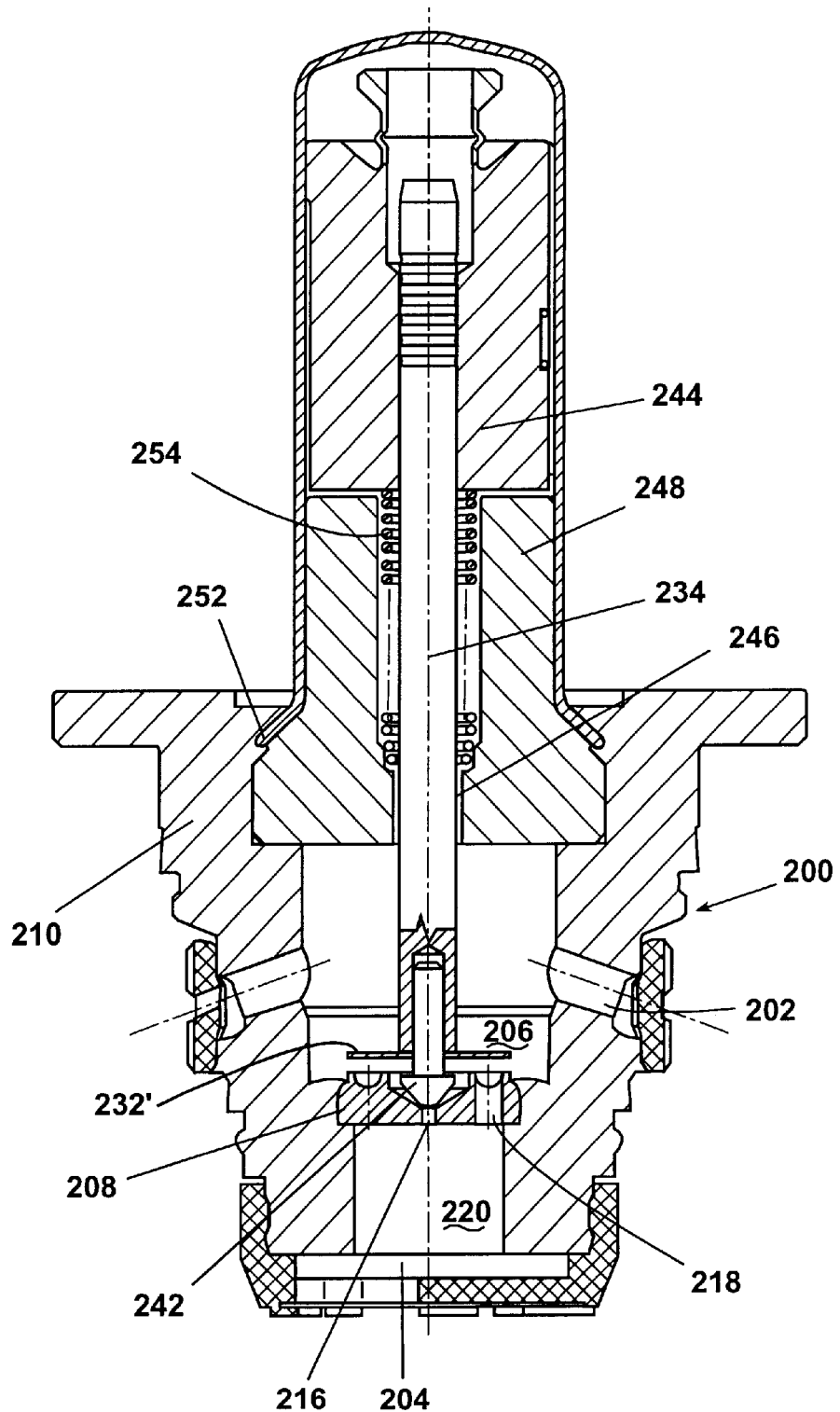
FIG. 9 is a cross-sectional view of the switchable orifice control valve with the valve plate serving as a check valve.

In another embodiment, referring to FIGS. 7–9, valve plate 232' is sized such that peripheral edge 262' is spaced inwardly from interior wall 264, but extends beyond parallel perimeter bores 218. When valve plate 232' is in the open position, fluid flows from master cylinder port 202 around peripheral edge 262' to wheel caliper port 204.

Overview of Operation of Solenoid Valve with Switchable Orifice

Referring to FIGS. 4–8, the operation of solenoid valve 200 will now be explained. Solenoid valve 200 is shown in the open position in FIG. 5. When the solenoid coil assembly (not shown) is energized, a magnetic field axially displaces magnetic armature 244 and thereby tappet 234, toward valve seat 208 until sealing portion 242 of tappet 234 abuts against side walls 268 or funnel shaped section 224 to seal off center orifice 216. Valve plate 232 follows tappet 234 until a section of valve plate 232 spaced radially inwardly from peripheral edge 262 seals off perimeter bores 218, as seen in FIG. 6. Because the collective length of reduced diameter portion 238, annular rim 240 and sealing portion 242 is substantially equal to the collective depth of funnel shaped section 224 and shoulder 222, valve plate 232 abuts directly against input end 212 of valve seat 208 to seal off perimeter bores 218. Once a fluid connection between master cylinder port 202 and wheel caliper port 204 is closed, pressure will build in first pressure chamber 206 while pressure decreases in second pressure chamber 220, thereby generating a force which securely holds valve plate 232 against valve seat 208.

When solenoid valve 200 is de-energized for a pressure build during anti-lock brake mode, i.e., where master cylinder pressure is still applied, sealing portion 242 of tappet 234 will disengage from funnel shaped section 224 and partially unseal from the center orifice 216, as seen in FIG. 7. Due to the pressure drop in second pressure chamber 220, a force greater than a return force from spring 254 maintains valve plate 232 against perimeter bores 218. As spring 254 biases magnetic armature 244 away from magnetic core 248, annular rim 240 cooperates with valve plate 232 to limit the axial travel of tappet 234 and place tappet 234 in an intermediate position. The intermediate position limits the in-rush of fluid to wheel caliper port 204 such that fluid flow is restricted around tappet 234 as seen best in FIG. 8. Further, because only center orifice 216 is open, the pressure gain is reduced for anti-lock mode pressure builds. Thus, excessive overshooting of a desirable pressure level in the wheel caliper port 204 being controlled by anti-lock brake mode is prevented.

After pressure from the master cylinder port 202 is released, i.e., the driver of the vehicle releases the brake pedal, the return force of spring 254 may then fully return, lifting valve plate 232 off of valve seat 208 and permitting flow through both center orifice 216 and perimeter bores 218.

Referring to FIG. 9, valve plate 232 may also function as a check valve. In the event solenoid valve 200 is energized during brake pedal release, valve plate 232 serves to release pressure from second pressure chamber 220 by moving axially away from valve seat 208. Annular shoulder 260 serves to limit the axial movement of valve plate 232.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A switchable solenoid valve for use in a braking system having an anti-lock brake mode, comprising:

a valve housing having a first fluid port and a second fluid port;

a valve seat disposed in said housing and positioned between said first fluid port and said second fluid port, wherein said valve seat includes at least two bores therethrough to fluidly connect said first fluid port to said second fluid port;

a valve plate mounted for axial movement within said valve housing to seal against said valve seat, wherein said valve plate includes a center bore formed therein wherein said valve plate is movable between a valve plate open position and a valve plate closed position, said valve plate open position providing a pressure fluid connection between said first and second fluid ports through at least a first of said at least two bores of said valve seat, said valve plate closed position interrupting said pressure fluid connection between said first and second fluid ports through at least a first of said at least two bores of said valve seat; and a tappet mounted for axial movement within said valve housing to seal against said valve seat, said tappet being movable between a tappet open position and a tappet closed position, wherein said tappet open position provides a pressure fluid connection between said first and second fluid ports through at least a second of said at least two bores of said valve seat, said tappet closed position interrupting said pressure fluid connection between said first and second fluid ports through at least a second of said at least two bores of said valve seat, wherein said valve housing further includes a first pressure chamber and a second pressure chamber, said first pressure chamber being disposed on a first side of said valve seat and said first fluid port opening into said first pressure chamber, said second pressure chamber being disposed on a second side of said valve seat and said second fluid port opening into said second pressure chamber, wherein said valve plate has a diameter that is less than a diameter of said first pressure chamber such that a peripheral edge of said valve plate extends to interior walls of said first pressure chamber, wherein said peripheral edge further includes a plurality of notches formed therein, said notches extending radially inwardly from said peripheral edge, wherein said notches are equally spaced apart, wherein said center bore further includes a plurality of radial channels formed thereon, said channels extending radially outwardly from a peripheral edge of said center bore, wherein said valve plate is mounted for axial movement on said tappet.

2. The switchable solenoid valve of claim 1, wherein the at least two bores of said valve seat include a primary orifice and at least one secondary bore.

3. The switchable solenoid valve of claim 2, wherein said primary orifice is greater in size than said at least one secondary bore.

4. The switchable solenoid valve of claim 2, wherein said valve plate seals said at least one secondary bore when in said valve plate closed position.

5. The switchable solenoid valve of claim 2, wherein said tappet is positioned in said valve housing so as to be aligned with said primary orifice, said tappet further including a sealing portion for sealing said primary orifice when in said tappet closed position.

6. The switchable solenoid valve of claim 1, wherein said tappet further includes a reduced diameter portion and an annular rim, said valve plate being mounted on said reduced diameter portion through said center bore, said reduced diameter portion and said annular rim cooperating to limit the axial movement of said valve plate with respect to said tappet.

7. The switchable solenoid valve of claim 2, wherein said solenoid valve closes said fluid connection between said first and second fluid ports by energizing said tappet into said tappet closed position, wherein said valve plate moves into said valve plate closed position by following said tappet.

8. The switchable solenoid valve of claim 7, wherein said tappet is energized in said closed position by a magnetic field being generated around a portion of said valve housing.

9. The switchable solenoid valve of claim 7, wherein pressure builds in said first pressure chamber and said pressure drops in said second pressure chamber when said valve plate is in said valve plate closed position and said tappet is in said tappet closed position to secure said valve plate against said valve seat.

10. The switchable solenoid valve of claim 9, wherein said tappet moves axially into an intermediate position when said solenoid valve de-energizes said tappet, whereby said tappet partially unseals said primary orifice to permit pressure fluid to restrictedly flow between said first fluid port and said second fluid port, wherein a pressure drop in said first pressure chamber is caused by said restricted flow of pressure fluid thereby maintaining valve plate against said valve seat and sealing at least said at least one secondary bore.

11. The switchable solenoid valve of claim 10, wherein the axial movement of said tappet is restricted by said annular rim contacting and abutting against said valve plate.

12. The switchable solenoid valve of claim 9, wherein said valve plate moves axially away from said valve seat to release fluid pressure from said second pressure chamber when the pressure of said second pressure chamber exceeds the pressure of said first pressure chamber.

13. The switchable valve of claim 11, wherein the axial movement of said valve plate is restricted by an annular shoulder of said tappet.

14. A switchable solenoid valve in a brake system having an anti-lock mode, comprising:

a valve housing having a master cylinder port and a wheel caliper port;

a valve seat disposed in said housing and positioned between said master cylinder and wheel caliper ports, wherein said valve seat includes a primary orifice and at least two secondary bores therethrough to fluidly connect said master cylinder and wheel caliper ports;

a tappet mounted for axial movement within said valve housing so as to be generally aligned with said primary orifice, said tappet being movable between a tappet fully open position, an intermediate position and a tappet closed position, wherein said tappet fully open position provides a maximum amount of pressure fluid to flow between said master cylinder and wheel caliper ports through said primary orifice, said intermediate position provides a restricted amount of pressure fluid to flow between said master cylinder and wheel caliper ports through said primary orifice, said tappet closed position interrupting fluid flow between said master cylinder and wheel caliper ports through said primary orifice; and a valve plate mounted on said tappet for axial movement within said valve housing to seal against said secondary bores in said valve seat, wherein said valve plate is movable between a valve plate open position and a valve plate closed position, said valve plate open position permitting pressure fluid flow between said master cylinder and said wheel caliper ports through said secondary bores, said valve plate closed position interrupting said pressure fluid flow between said master cylinder and wheel caliper ports through said secondary bores;

wherein said solenoid valve is in an normally open position when said tappet is in said tappet open position and said valve plate is simultaneously in said valve plate open position; and said solenoid valve is in a closed position when said tappet is in said tappet closed position and said valve plate is simultaneously in said valve plate closed position;

wherein said brake system is in said anti-lock mode when said tappet is in said intermediate position and said valve plate is in said valve plate closed position.

15. The switchable solenoid valve in claim 14, wherein said valve plate is mounted so as to be axially movable independent of said tappet axial movement.

16. The switchable solenoid valve in claim 14, wherein said tappet further includes a reduced diameter portion that is receivable within a center bore of said valve plate, an annular rim to prevent said valve plate from being disengaged from said tappet, and a sealing portion for abutting against and sealing closed said primary orifice in said valve seat.

17. The switchable solenoid valve of claim 16, wherein said center bore further includes a plurality of radial channels formed thereon, said channels extending radially outwardly from said mounting bore such that said valve plate is axially movable along said reduced diameter portion of said tappet.

18. The switchable solenoid valve in claim 14, wherein said valve plate further includes a plurality of notches formed on a peripheral edge of said valve plate to increase pressure fluid flow when said valve plate is in said valve plate open position, said notches extending radially inwardly from said peripheral edge.

* * * * *